July 16, 1935.                I. COWLES                2,008,175
FLEXIBLE CONDUIT
Filed July 13, 1933
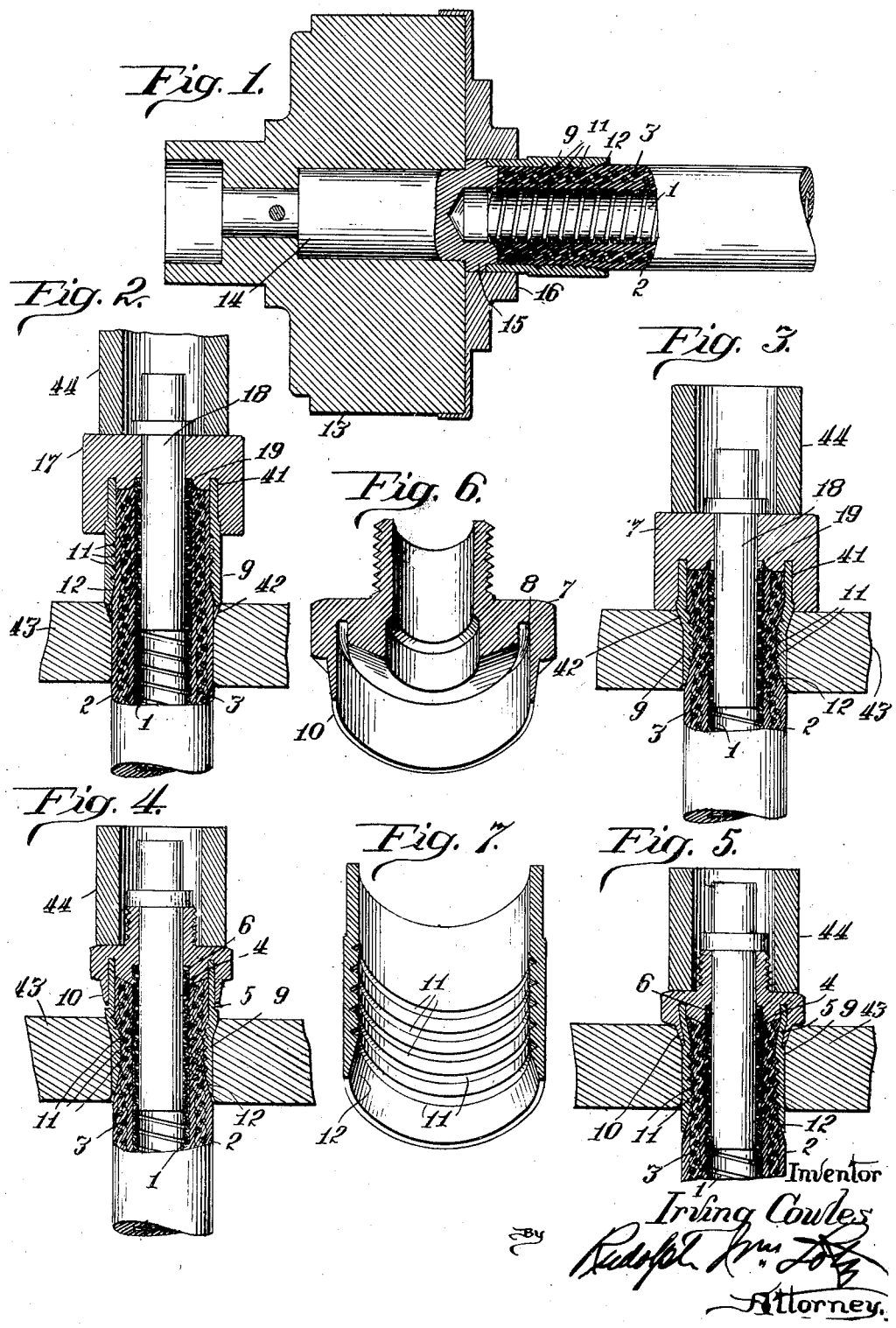

Patented July 16, 1935

2,008,175

UNITED STATES PATENT OFFICE 2,008,175

FLEXIBLE CONDUIT

Irving Cowles, Detroit, Mich.

Application July 13, 1933, Serial No. 680,200

2 Claims. (Cl. 285—84)

This invention relates to improvements in flexible conduits and method of making the same, including new and useful improvements in the couplings constituting parts of said conduits.

The main object of the invention is to provide a flexible conduit which is rendered leak-proof at the point or points at which leakage is most apt to occur under high fluid-pressure within the conduit.

Other important and essential objects of the invention are pointed out in the following specification.

The invention, in its several exemplary physical embodiments is illustrated in and by the accompanying drawing, wherein:

Fig. 1 is a central longitudinal section of a die or tool employed in assembling a piece of flexible conduit with one member of a hose coupling and discloses the first step in the method of the present invention and in part, the unfinished structure.

Figs. 2 and 3 are views similar to Fig. 1, illustrating the second and third steps of the method of the invention.

Figs. 4 and 5 illustrate the further steps of effecting completion of the assembly of the structure including another member of the coupling employed.

Fig. 5 shows the completed structure produced by the method aforesaid.

Fig. 6 is a central longitudinal, perspective section of the body portion of the hose coupling employed and Fig. 7 illustrates the sleeve portion of said coupling.

By reference to the drawing it will be noted (see Figs. 5 and 9) that the flexible portion of the conduit structure consists of a well-known type of metal lined rubber hose wherein the inner wall (1) consists of a pair of channeled strips disposed in opposed overlapped relation, to form a continuous helical wall structure which is encased in the rubber tube (2). The latter may include a wire reinforcement (3) embedded therein, as shown in Fig. 5 or may be devoid of such reinforcement as shown in Fig. 9. Generally speaking, the rubber casing (2) is wrapped with a textile covering shown in Fig. 9, but omitted from Fig. 5.

The flexibility of the wall (1) which is such that contraction thereof will occur under the influence of radial pressure on the external surface of the casing (2) such as is relied upon generally to provide a fluid tight joint between the flexible conduit and the metal coupling at the ends of the latter, thus limiting the degree of such external pressure to a point less than that which will cause the wall (1) to contract. Accordingly, the said pressure is insufficient to prevent leakage under the influence of high degree of fluid pressure within the conduit structure, because the fluid under such high pressure will penetrate through or past the wall (1) and past the end of the casing (2) where it abuts the opposed wall of the metal coupling and thus finds its way to the inner face of the tubular wall of the coupling which is compressed against the outer surface of the wall (2) and where this occurs leakage will result.

In the case of reinforced hose (2) such as is illustrated in Fig. 5, the fluid under pressure passing between the end of the rubber wall (2) and the opposed wall of the coupling, will penetrate said rubber wall around the wires of the reinforcing structure (3) and will soon destroy the portion of the wall (2) outwardly of the reinforcement (3).

Obviously, if the wall (2) is wrapped with fabric and the latter extends to the end of the hose within the coupling, the penetration of fluid between the end of the hose and the opposed wall of the coupling will follow the fabric wrapping very easily and cause leakage.

The main object of the invention is, therefore, to prevent leakage of fluid past the annular corner (4) at the meeting point of the annular shoulder (5) of the coupling which is opposed to the end of the wall (2) of the flexible conduit, and the throat (6) of the coupling into which the lining (1) projects.

This is accomplished by crowding the wall (2) against the shoulder (5) with sufficient permanently maintained force to prevent leakage as aforesaid under the influence of the maximum degree of fluid pressure, capable of resistance by the flexible conduit or, in other words, the hose-bursting pressure.

I am aware that the pior art discloses conduit structures wherein the end of the rubber wall of the hose abuts a shoulder similar to the shoulder (5) of the couplings illustrated in the accompanying drawing, but I do not know of any prior art disclosure of structure and method of assembly of hose and coupling capable of producing the result which I attain by means of the present invention.

Referring now to Fig. 5, it will be noted that the conduit or hose, which has been previously described as comprising the inner lining (1) corresponding to the lining (21) shown in Figs. 8 and 9, and as having the rubber wall (2) in which a wire reinforcement (3) such as braided wire, is imbedded and reference was made to the fluid-tight joint formed at the sharp corner (4) between the annular shoulder (5) and the throat (6) of the coupling employed.

In this structure the coupling comprises the body member (7) which is externally hexagonal and which is provided with an annular recess (8) in which one end of the sleeve (9) is received.

The said body portion of the coupling is also equipped with an internally cylindrical and externally tapered annular flange (10) as shown in Fig. 6, which surrounds the portion of the sleeve (9) adjacent the end portion which is received within the annular recess (8).

As shown in Fig. 7, the sleeve (9) is provided internally with a sharply pitched thread formation (11) and with a slightly flaring mouth (12) into which one end of the conduit is inserted and by relative rotation of the same and, said sleeve (9), is caused to engage the said thread formation (11).

Before such insertion, however, a portion of the rubber wall and of the reinforcing wire structure (3) is cut away so as to leave a portion of the lining (1) projecting from the end of the hose and this projecting end portion is shorter than the length of the throat (6) in which the same is received.

Initially, the sleeve (9) is first mounted upon the conduit in a position so that one end portion of said sleeve opposite to the flaring mouth portion (12) thereof, projects a short distance beyond the rubber wall (2). The conduit and sleeve are then placed in a die, shown in Fig. 1, which presents a body portion (13) having a central recess in which a die (14) is received and rigidly held. The die (14) projects from one end of the die (13) and is equipped with an annular flange (15) which bears upon the die (13) around the recess in which the die (14) is received. The said projecting end portion of the die (14) projects into the central opening of a die (16) which is mounted upon the die (13) and has a central opening to receive the said flange (15) and which cooperates with the outermost end portion of the die (14) to provide an annular recess in which the said projecting end portion of the sleeve (9) is received.

The said annular recess last mentioned, is of appreciably less depth than the annular groove (8) of the coupling which later receives said end portion of the sleeve (9). The said die (14) also has a central opening into which the projecting end portion of the metal lining (1) of the conduit is received.

The said dies (13, 14 and 16) are employed only to effect primary proper positioning of the sleeve (9) upon the conduit and when this has been accomplished the said sleeve (9) and conduit are released from said dies and are placed in a die (17) which is shown in Fig. 2. The latter comprises a cylindrical block having a central opening through which a mandrel (18) projects into the bore of the conduit. Said bore is bordered by a throat (19) and the latter by an annular shoulder (4) and this, in turn, is bordered by the annular groove (41) which receives the end portion of the sleeve (9), one wall of said groove being extended to appreciable length to embrace an appreciable length of the sleeve (9).

The other end of said sleeve (9) is now disposed in the flaring mouth (42) of the opening in a die (43), the said opening being substantially equal in diameter to the inner diameter of the sleeve (9). The die (43) is mounted upon the bed-plate of a punch press and the plunger (44) of said press is caused to engage the die (17) and force the same down to the die (43) as shown in Fig. 3, whereby the flaring mouth portion and body of the sleeve (9) are contracted upon the conduit to the extent clearly shown in Fig. 3.

The punch plunger is now retracted and the said die (17) removed from the sleeve (9) and coupling member (7) is then mounted upon the sleeve (9) while the latter remains engaged in the die (43) in the position in which it was left as shown in Fig. 3. When so positioned, the said coupling member (17) will be so disposed that the extremity of the sleeve (9) projecting into the same will not be disposed completely within the annular groove (8), but will be disposed substantially at the mouth of said groove (8).

After the said coupling member (7) is disposed as shown in Fig. 4 the press plunger (44) is again brought down to force the coupling member (7) home and, thereafter, to sink the sleeve (9) and the annular flange (10) of said coupling member (7) into the die (43) to the position shown in Fig. 5, thereby contracting the flange (10) at the same time as the sleeve (9) is fully contracted and causing the annular shoulder (5) of the coupling member (7) to force back the wall of the conduit to provide the fluid-tight joint at said shoulder as in the case of shoulder (26) of the structure shown in Figs. 8 and 9.

After this operation has been completed the press plunger is withdrawn and the die (43), which preferably consists of two separable parts, though not so illustrated specifically, is opened and the completed structure is removed. In the structure shown in Figs. 1 to 5 inclusive, only one end portion of the conduit is illustrated, it being understood of course, that couplings are mounted upon both ends of the latter.

Preferably a mandral such as the element 19 of Fig. 2 is inserted into the bore of the smaller end portion of the female member and into the end portion of the hose to act as a guide, in an obvious manner, during the assembly operation last described.

Attention is directed to the fact that the present invention is directed exclusively to successful sealed coupling of what may be termed "internally armoured hose" with a source of supply of fluid under pressure and that it is very essential to the structures and method hereinabove described that the metal lining of the hose shall be movable longitudinally during the assembly of the structures illustrated.

It is also pointed out that if a nipple rigid with a coupling member and which enters the end of the hose is present, as is usual in the case of hose devoid of the internal armour, the contraction of the male coupling member about the hose has the effect of causing the latter to grip the nipple so firmly as to preclude longitudinal movement of the hose by the male coupling member to crowd the latter against the sealing shoulder. Furthermore, in the case of the last-mentioned type of hose, it is essential only to provide a seal along the nipple because if leakage here is prevented, the fluid under pressure cannot penetrate between the hose end and the sealing shoulder opposed thereto.

I claim as my invention:

1. A flexible conduit structure comprising a body member having a central bore including an annularly enlarged end portion, said body member provided with a cylindrical groove spaced from and concentric with said enlarged portion of said bore, an annular flange bordering the mouth of said groove, said body member presenting an annular hose-engaging shoulder between said groove and said bore, an unsplit sleeve having one end portion engaged in said groove and presenting a tapered contracted portion between its ends engaged by said flange to retain said sleeve engaged in said groove and presenting a cylindrical outer end portion, a hose length of larger diameter than any portion of said sleeve engaged by the cylindrical outer end and tapered portions of said sleeve and having an end wall thereof compressed against said shoulder, and an inner metal tube within the hose length projecting from the end thereof into the enlarged portion of said bore.

2. The combinaton with a flexible hose equipped with an inner metallic tubular lining member projecting from the same at one end thereof, of a coupling comprising a body member having a central bore in which said projecting end of the hose lining is received, an annular shoulder surrounding said bore and against which the flexible hose wall abuts, an annular flange overhanging said shoulder and bordering a cylindrical groove surrounding said shoulder, an unsplit sleeve engaged at one end in said groove and presenting a tapered contracted portion adjoining said last-named end and engaged by said flange, the remaining portion of said sleeve being cylindrical and said last-named portion and said tapered portion being of smaller diameter than the normal diameter of the hose and mounted upon the latter.

IRVING COWLES.